United States Patent
Shigenaga et al.

(10) Patent No.: US 6,629,781 B2
(45) Date of Patent: Oct. 7, 2003

(54) FERRULE FOR A MULTI FIBER OPTICAL CONNECTOR AND METHOD OF MANUFACTURING THE MULTI FIBER OPTICAL CONNECTOR

(75) Inventors: Takashi Shigenaga, Tokyo (JP); Katsuki Suematsu, Tokyo (JP); Masao Shinoda, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/910,136

(22) Filed: Jul. 20, 2001

(65) Prior Publication Data

US 2002/0146213 A1 Oct. 10, 2002

(30) Foreign Application Priority Data

Apr. 6, 2001 (JP) ........................................ 2001-109098

(51) Int. Cl.[7] .............................. G02B 6/36; G02B 6/38
(52) U.S. Cl. ............................. 385/78; 385/59; 385/77; 385/83
(58) Field of Search .............................. 385/59, 60, 65, 385/77, 78, 83

(56) References Cited

U.S. PATENT DOCUMENTS 5,600,747 A * 2/1997 Yamakawa et al. ............ 385/59
6,095,695 A * 8/2000 Ohtsuka et al. ................ 385/72

* cited by examiner

*Primary Examiner*—Jordan M. Schwartz
*Assistant Examiner*—Tim Thompson

(57) ABSTRACT

In a ferrule for a multi fiber optical connector of the multi stages where at least two layers of guide grooves and fiber holes are laminated, a distance of from a straight line that connect middle points between the center axes of the fiber holes that make up a fiber hole array at one end side in a laminating direction and the center axes of the fiber holes that make up a fiber hole array at another end side to an upper side of the entry is longer than a distance of from the straight line to a lower side of the entry. A ceiling of the entry is notched so that an inclination of the multi fiber tape is not regulated by the upper side of the entry when a leading end of each of the optical fibers is pressed against the corresponding guide groove while the multi fiber tape inserted from the entry is inclined toward the upper side of the entry. In a method of manufacturing a multi fiber optical connector, the multi fiber tape is inserted into the ferrule from the entry while being inclined obliquely downward.

8 Claims, 7 Drawing Sheets

FERRULE FOR A MULTI FIBER OPTICAL CONNECTOR AND METHOD OF MANUFACTURING THE MULTI FIBER OPTICAL CONNECTOR

FIELD OF THE INVENTION

The present invention relates to a ferrule for a multi fiber optical connector and a method of manufacturing the multi fiber optical connector.

DESCRIPTION OF THE RELATED ART

Up to now, there are a variety of ferrules for a multi fiber optical connector one of which is a ferrule for a multi fiber optical connector as shown in FIG. 8. The ferrule for a multi fiber optical connector includes an entry B into which a tape-like multi optical fiber A (hereinafter referred to as "multi fiber tape A") is insertable, a plurality of guide grooves D that guide the respective optical fibers C that makes up the multi fiber tape A inserted from the entry B, and a plurality of fiber holes E into which the respective optical fibers C guided by the guide grooves D are inserted. More specifically, as shown in FIGS. 9A to 9C, two upper and lower fiber hole arrays F where the fiber holes E are arranged in parallel lines are laminated. Each of the fiber holes E that make up the fiber hole arrays E is made up of a guide hole G that communicates with the guide groove D and a minute hole H that communicates with the guide hole G. Each of the optical fibers C of the multi fiber tape A inserted from the entry B is inserted into the corresponding guide hole G while being guided by the corresponding guide groove D and then inserted into the minute hole H while being guided by the guide hole G.

A method of manufacturing the multi fiber optical connector by fitting the ferrule for a multi fiber optical connector thus structured onto a leading end of the multi fiber tape will be described below.

(1) As shown in FIG. 9A, the multi fiber tape A inserted into the ferrule for a multi fiber optical connector from the entry B of the ferrule is inclined toward a direction indicated by an arrow in the figure. As a result, the leading end of each of the optical fibers C is lifted up as shown in FIG. 9B.

(2) In a state where the leading end of each of the optical fibers C is kept lifting up, the multi fiber tape A is jammed forward in such a manner that the leading end of each of the optical fibers C is positioned above a given one of the guide grooves D continuously disposed on the lower fiber hole array $F_2$.

(3) The multi fiber tape A is inclined in a direction indicated by an arrow in FIG. 9B. As a result, the leading end of each of the optical fibers C is pressed against the corresponding guide groove D as shown in FIG. 9C.

(4) While the leading end of each of the optical fibers C is pressed against the corresponding guide groove D, each of the optical fibers C is jammed forward while being guided by the lower guide groove D. As a result, each of the optical fibers C is inserted into each of the lower guide holes G. Therefore, each of the optical fibers C is inserted into each of the minute holes H while being guided by the guide hole G.

(5) Another multi fiber tape not shown is inserted from the entry B, and each of the optical fibers is inserted into each of the fiber holes E that make up the upper fiber hole array F1 in the same manner as that described above.

(6) An adhesive is injected from an adhesive inlet L to fix those two multi fiber tapes to the ferrule for a multi fiber optical connector.

(7) As occasion demands, an end face K of the ferrule for a multiple fiber optical connector (FIG. 9A) is polished.

The above-described conventional ferrule for a multi fiber optical connector suffers from problems stated below.

As shown in FIG. 9C, a distance $H_1$ of from a straight line X-X that connects middle points between the center axes of the fiber holes E that make up the upper fiber hole array $F_1$ (FIG. 8) and the center axes of the fiber holes E that make up the lower fiber hole array $F_2$ (FIG. 8) to an upper side N of the entry B is identical with a distance $H_2$ of from the straight line X-X to a lower side P of the entry B. Specifically, $H_1=H_2=1.075$ mm is satisfied. Therefore, even if the leading end of each of the optical fibers C is going to be pressed against the corresponding guide groove D while the multi fiber tape A inserted from the entry B is inclined toward the upper side N of the entry B as shown in FIG. 9C, the multi fiber tape A is unavoidably abutted against the upper side N, thereby making it impossible to sufficiently incline the multi fiber tape A. Therefore, the leading end of each of the optical fibers C is insufficiently pressed against the corresponding guide grooves D. As a result, the guide grooves D cannot be sufficiently utilized, thereby making it difficult to insert the optical fibers C into the corresponding fiber holes E. This problem is particularly remarkable when the leading end of each of the optical fibers C is pressed against the corresponding one of the guide grooves D continuously disposed on the upper fiber hole array $F_1$. Also, the problem becomes severer as the number of fiber hole arrays increases more.

SUMMARY OF THE INVENTION

According to a first aspect of the present invention, there is provided a ferrule for a multi fiber optical connector comprising: an entry into which a multi fiber tape is insertable; guide groove arrays in which a plurality of guide grooves that guide the respective optical fibers that make up the multi fiber tape inserted from the entry are arranged in plural parallel lines; and fiber hole arrays in which a plurality of fiber holes into which the respective optical fibers guided by the respective guide grooves are inserted are arranged in plural parallel lines; wherein said guide groove arrays and said fiber hole arrays are laminated at plural stages, and a distance of from a straight line that connects middle points between the center axes of the fiber holes that make up a fiber hole array at one end side in a laminating direction and the center axes of the fiber holes that make up a fiber hole array at another end side to an upper side of the entry is longer than a distance of from the straight line to a lower side of the entry.

According to another aspect of the present invention, there is provided a ferrule for a multi fiber optical connector comprising: an entry into which a multi fiber tape is insertable; guide groove arrays in which a plurality of guide grooves that guide the respective optical fibers that make up the multi fiber tape inserted from the entry are arranged in plural parallel lines; and fiber hole arrays in which a plurality of fiber holes into which the respective optical fibers guided by the respective guide grooves are inserted are arranged in plural parallel lines; wherein a ceiling of the entry is notched to form an opening so that an inclination of the multi fiber tape is not regulated by the upper side of the entry when a leading end of each of the optical fibers is pressed against the corresponding guide groove while the multi fiber tape inserted from the entry is inclined toward the upper side of the entry.

According to still another aspect of the present invention, there is provided a method of manufacturing a multi fiber optical connector comprising: an entry into which a multi fiber tape is insertable; guide groove arrays in which a plurality of guide grooves that guide the respective optical fibers that make up the multi fiber tape inserted from the entry are arranged in plural parallel lines; and fiber hole arrays in which a plurality of fiber holes into which the respective optical fibers guided by the respective guide grooves are inserted are arranged in plural parallel lines, in which a ferrule for the multi fiber optical connector having said guide groove arrays and said fiber hole arrays laminated at plural stages is fitted to the multi fiber tape; said method comprising the steps of: providing an angle between each of the optical fibers of multi fiber tape and a plane extending in the arrangement direction of said guide grooves by inclining said multi fiber tape obliquely and downward when inserting the multi fiber tape into the ferrule for the multi fiber optical connector from the entry of the ferrule.

DETAILED DESCRIPTION

Now, a description will be given in more detail of preferred embodiments of the present invention with reference to the accompanying drawings.

FIRST EMBODIMENT

Figure 1:
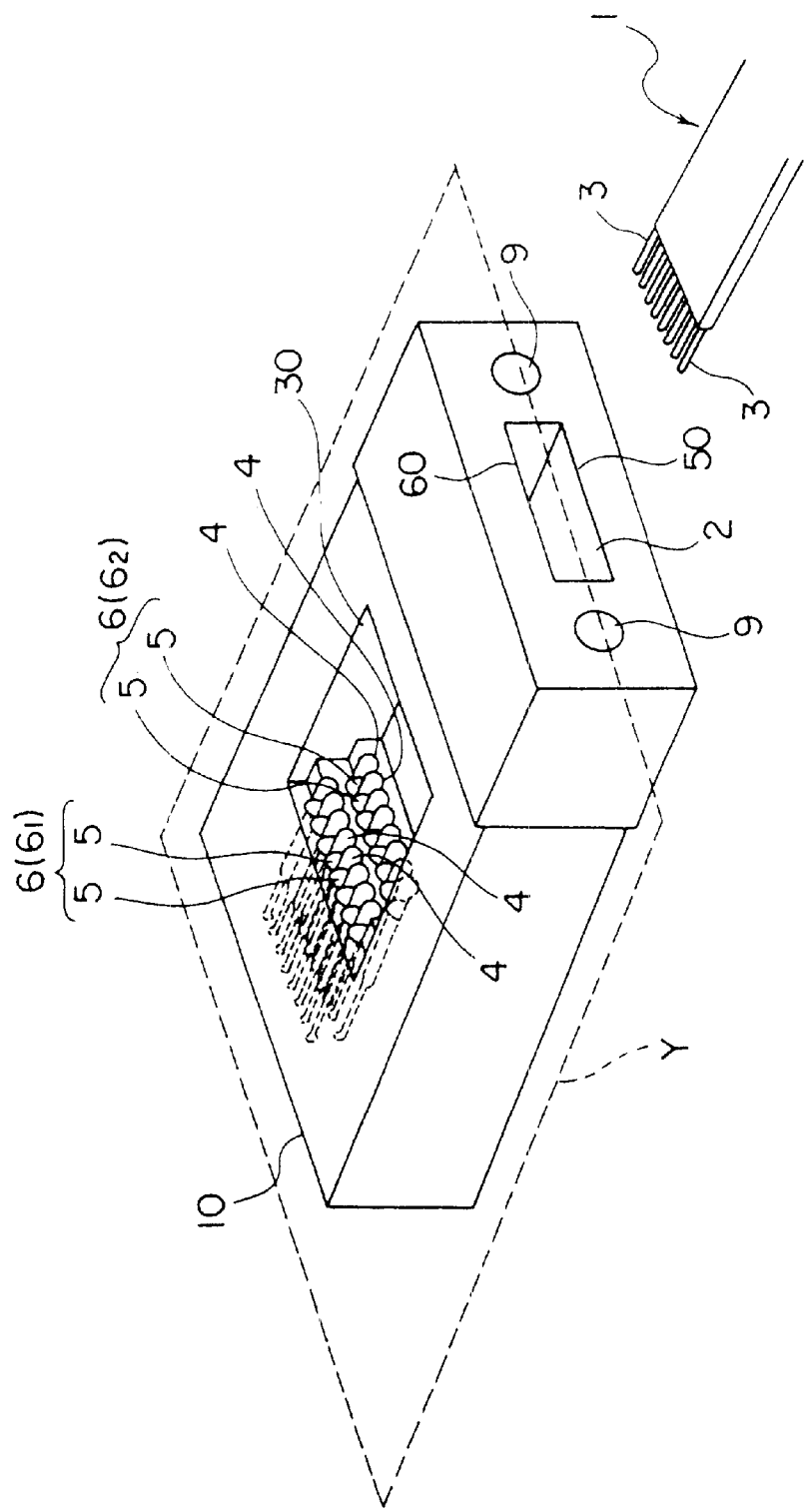
FIG. 1 is a perspective view showing a ferrule for a multi fiber optical connector in accordance with a first embodiment of the present invention.
Figure 2:
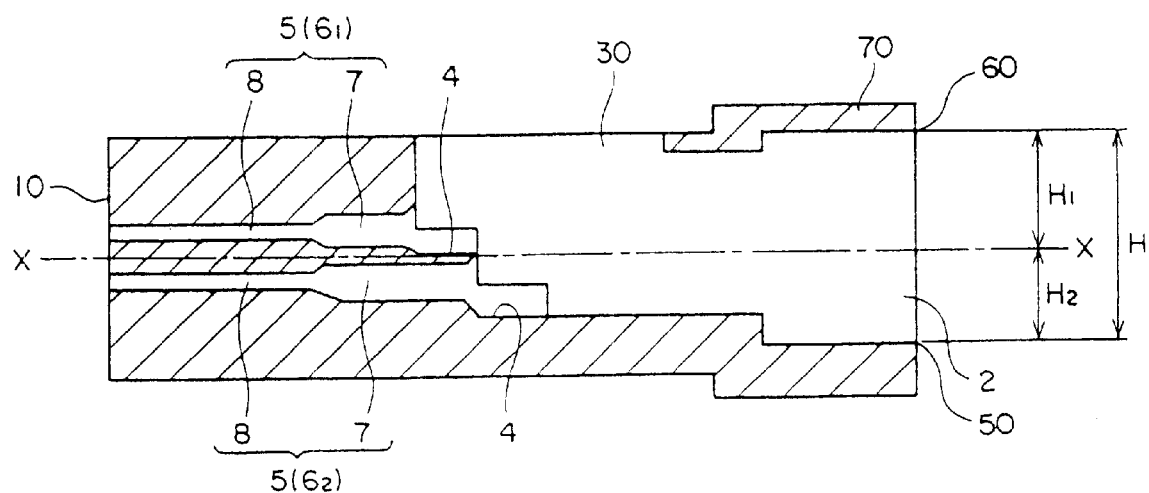
FIG. 2 is a vertical cross-sectional view showing the ferrule for a multi fiber optical connector shown in FIG. 1.
Figure 3:
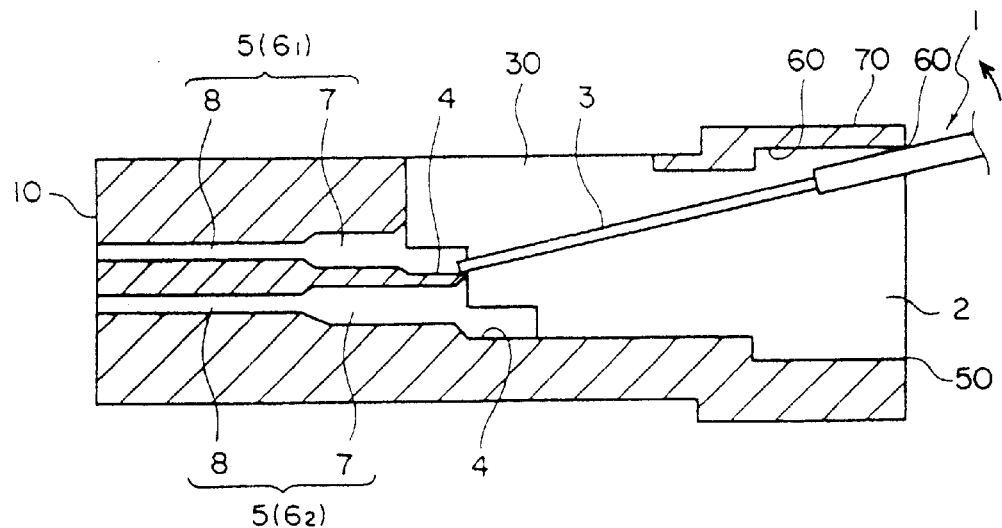
FIG. 3 is a vertical cross-sectional view showing a state in which the respective optical fibers of a multi fiber tape are pressed against the corresponding guide grooves of the ferrule for the multi fiber optical connector shown in FIG. 1.

An example of a ferrule for a multi fiber optical connector in accordance with a first embodiment of the present invention will be described with reference to FIGS. 1 to 3. As shown in FIG. 1, the ferrule for a multi fiber optical connector includes an entry 2 into which a tape-like multi optical fiber 1 (hereinafter referred to as "multi fiber tape 1") is insertable, a plurality of guide grooves 4 that guide the respective optical fibers 3 that makes up the multi fiber tape 1 inserted from the entry 2, and a plurality of fiber holes 5 into which the respective optical fibers 3 guided by the guide grooves 4 are inserted. More specifically, two upper and lower fiber hole arrays 6 where the fiber holes 5 are arranged in plural parallel lines are laminated at two stages. Each of the fiber holes 5 is made up of a guide hole 7 that communicates with the guide groove 4 and a minute hole 8 that communicates with the guide hole 7 (FIG. 2). Each of the optical fibers 3 of the multi fiber tape 1 inserted from the entry 2 is inserted into the corresponding guide hole 7 while being guided by the corresponding guide groove 4 and then inserted into the corresponding leading minute hole 8 of the guide hole 7 while being guided by the guide hole 4. A guide pin hole 9 is defined at each side of the entry 2. Those guide pinholes 9 are designed such that when an end face 10 of the ferrule for an optical connector and an end face of another ferrule for an optical connector of the same type are confronted with each other and connected to each other, guide pins for positioning those ferrules are inserted into those guide pin holes 9.

As shown in FIG. 2, assuming that the entry 2 is divided into upper and lower portions with a straight line X-X that connect middle points between the center axes of the fiber holes 5 that make up the upper fiber hole array 6, and the center axes of the fiber holes 5 that make up the lower fiber hole array $6_2$ as a boundary line, the height of the upper portion than the straight line X-X is set to be higher than the height of the lower portion. That is, a distance $H_1$ of from the straight line X-X to an upper side 60 of the entry 2 is set to be longer than a distance $H_2$ of from the straight line X-X to a lower side 50 thereof. For example, $H_1$ is set to 1.325 mm and $H_2$ is 0.825 mm. Those numeric values are one example and may be other numeric values.

A method of manufacturing the multi fiber optical connector by fitting the ferrule for a multi fiber optical connector thus structured according to the present invention onto a leading end of the multi fiber tape will be described below.

(1) As shown in FIG. 1, the multi fiber tape 1 is inserted into the ferrule for a multi fiber optical connector from the entry 2 of the ferrule. In this situation, the multi fiber tape 1 is inclined toward the upper side 60 of the entry 2 so that the respective optical fibers 3 are directed downward, to thereby provide a given angle between the optical fibers 3 and a plane Y extending in the arrangement direction of the guide grooves 4 (FIG. 1).

Figure 9A:
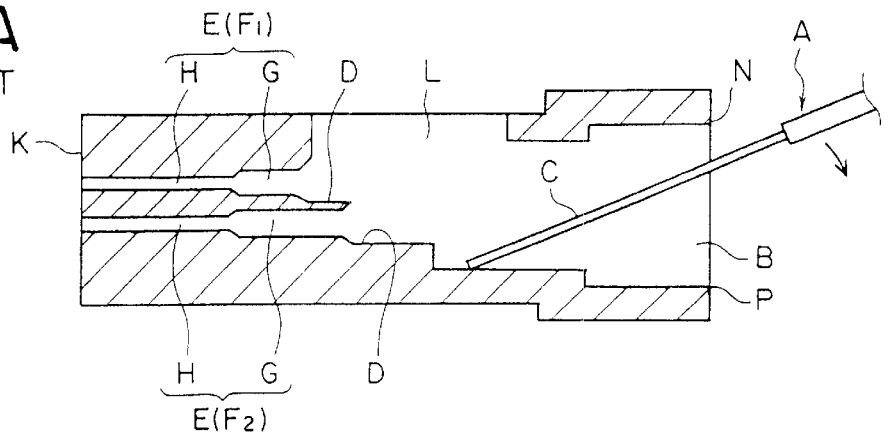
FIGS. 9A to 9C are process diagrams showing a conventional method of manufacturing the multi fiber optical connector.
Figure 9B:
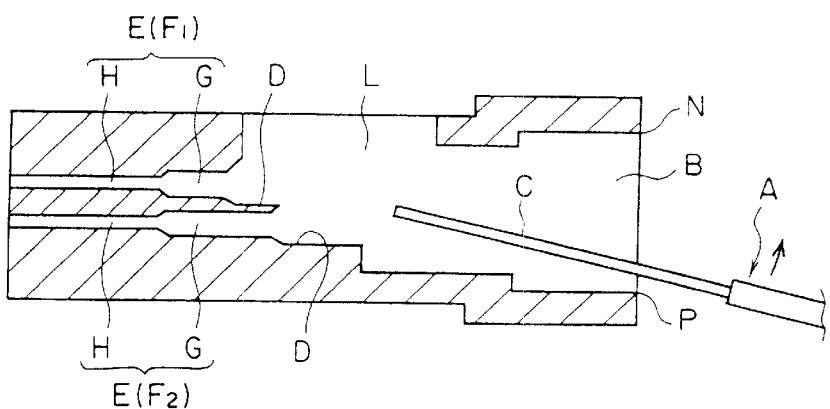

(2) As in the case shown in FIG. 9B, the multi fiber tape 1 is inclined toward the lower side 50 of the entry 2 to make the leading end of each of the optical fibers 3 lift up.

(3) In a state where the leading end of each of the optical fibers 3 is kept lifting up, the multi fiber tape 1 is jammed forward in such a manner that the leading end of each of the optical fibers 3 is positioned above a corresponding one of the guide grooves 4 continuously disposed on the lower fiber hole array $6_2$.

Figure 9C:
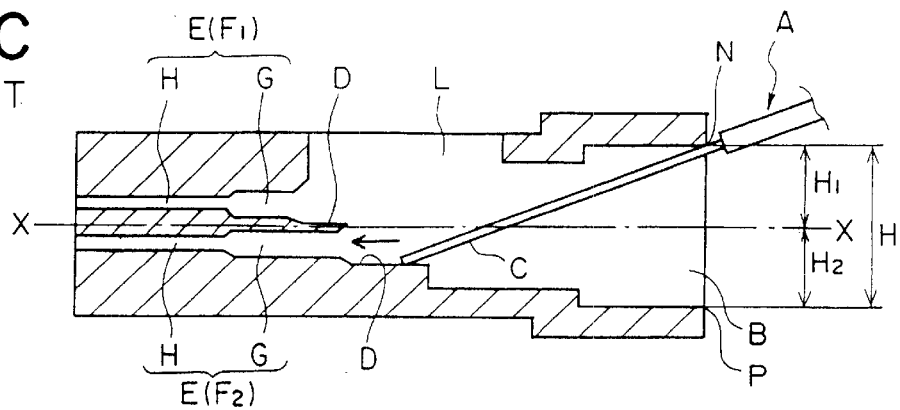

(4) As in the case shown in FIG. 9C, the multi fiber tape 1 is inclined toward the upper side 60 until the multi fiber tape 1 is abutted against the upper side 60 of the entry 2. With this operation, the leading end of each of the optical fibers 3 falls downward and is then pressed into the corresponding guide groove 4.

(5) While the leading end of each of the optical fibers 3 is pressed against the corresponding lower guide groove 4, each of the optical fibers 3 is jammed forward along the guide of the corresponding lower guide groove 4 so as to be inserted into the corresponding lower guide hole 7.

Thereafter, each of the optical fibers 3 is inserted into the corresponding minute hole 8 while being guided by the guide hole 7.

(6) Another multi fiber tape 1 is inserted from the entry 2, and each of the optical fibers 3 is inserted into the corresponding one of the fiber holes 5 that make up the upper fiber hole array $6_1$ in the same manner as that described above. In this situation, since the entry 2 of the ferrule for a multi fiber optical connector according to the present invention is set to the above-mentioned dimensions, when the multi fiber tape 1 inserted from the entry 2 is inclined toward the upper side 60 (in a direction indicated by an arrow in the figure) until the multi fiber tape 1 is abutted against the upper side 60 of the entry 2 as shown in FIG. 3, a sufficient angle is ensured between the respective optical fibers 3 and the respective guide grooves 4. Therefore, the leading end of each of the optical fibers 3 is surely pressed against the corresponding guide groove 4.

SECOND EMBODIMENT

Figure 4A:
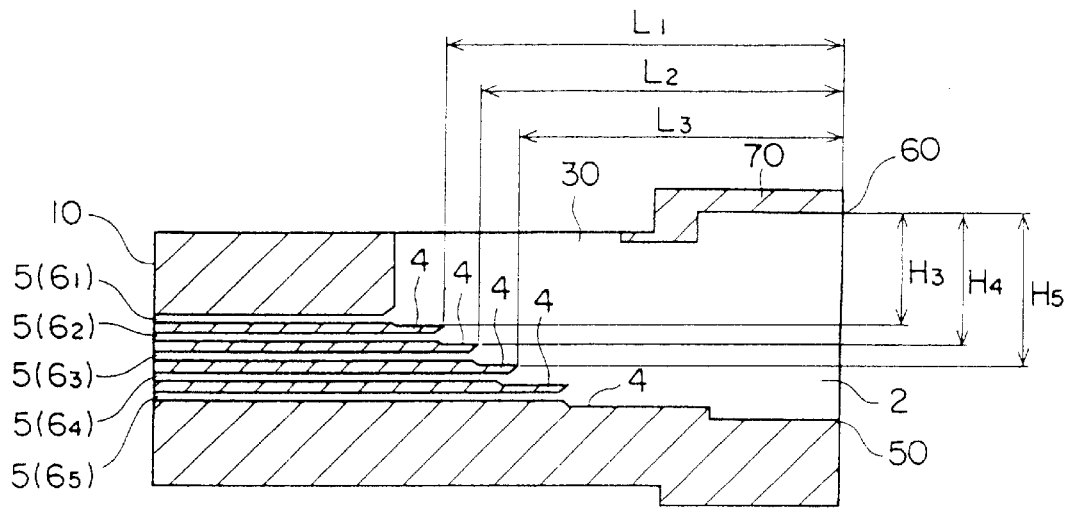
FIG. 4A is a vertical cross-sectional view showing a ferrule for a multi fiber optical connector in accordance with a second embodiment of the present invention.

A ferrule for a multi fiber optical connector in accordance with another embodiment of the present invention will be described with reference to FIGS. 4A and 4B. The basic structure of the ferrule for a multi fiber optical connector is identical with that shown in the above-described first embodiment. A difference from the first embodiment resides in that the fiber hole arrays 6 are of a vertically five-layer laminated structure as shown in FIG. 4A. Likewise, in this embodiment, a distance of from a straight line (not shown) that connect middle points between the center axes of the fiber holes 5 that make up the uppermost fiber hole array $6_1$ and the center axes of the fiber holes 5 that make up the lowermost fiber hole array $6_2$ to the upper side 60 of the entry 2 is set to be longer than a distance of from the straight line to the lower side 50 of the entry 2.

As shown in FIG. 4A, in the ferrule for a multi fiber optical connector in accordance with this embodiment, a distance $H_3$ between the surface of the guide grooves 4 continuously formed on the uppermost fiber hole array $6_1$ and the upper side 60 of the entry 2 is set to 0.95 mm, and a distance $L_1$ between the leading end of the guide grooves 4 and the entry 2 is set to 4.50 mm. Also, a distance $H_4$ between the surface of the guide grooves 4 continuously formed on the second upper fiber hole array $6_2$ and the upper side 60 of the entry 2 is set to 1.20 mm, and a distance $L_2$ between the leading end of the guide grooves 4 and the entry 2 is set to 4.00 mm. In addition, a distance $H_5$ between the surface of the guide grooves 4 continuously formed on the third upper fiber hole array $6_3$ and the upper side 60 of the entry 2 is set to 1.45 mm, and a distance $L_3$ between the leading end of the guide grooves 4 and the entry 2 is set to 3.50 mm. Those numeric values are one example and may be other numeric values.

A process of manufacturing the multi fiber optical connector by fitting the ferrule for a multi fiber optical connector thus structured according to the present invention onto a leading end of the multi fiber tape is identical with that in a case of using the ferrule for a multi fiber optical connector in accordance with the first embodiment. Also, as in the first embodiment, the multi fiber tape 1 inserted from the entry 2 can be sufficiently inclined in a direction indicated by an arrow in FIG. 4B in the manufacturing process. Therefore, the second embodiment can exhibit the same actions and effects as those in the case of using the ferrule for a multi fiber optical connector according to the first embodiment of the present invention. In particular, in the ferrule for a multi fiber optical connector according to this embodiment, although the fiber hole arrays 6 are laminated at five stages, the leading end of each of the optical fibers 3 can be surely pressed against the corresponding one of the guide grooves 4 continuously formed on the respective fiber hole arrays 6.

Figure 4B:
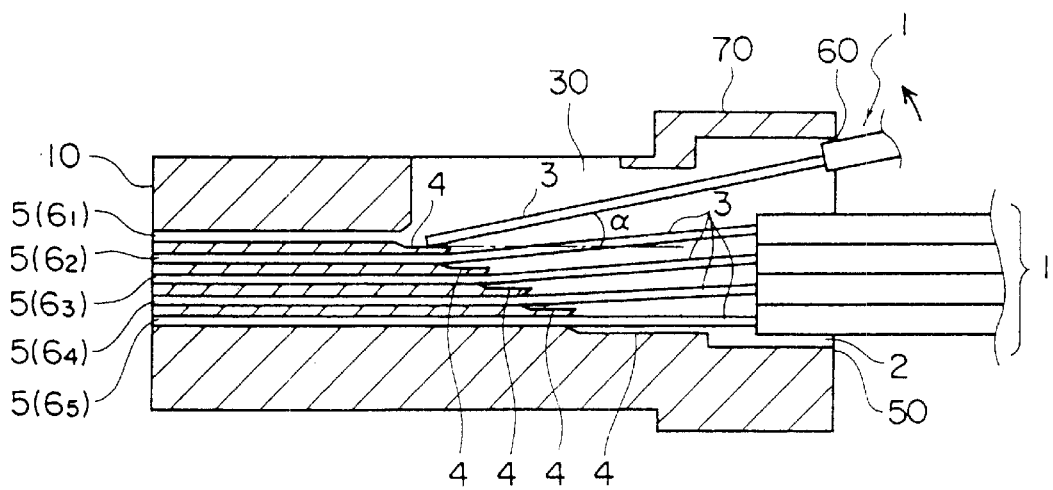
FIG. 4B is a vertical cross-sectional view showing a state in which the respective optical fibers of a multi fiber tape are pressed against the corresponding guide grooves of the ferrule for the multi fiber optical connector.

As shown in FIG. 4B, in the case where the multi fiber tape 1 having the leading ends of the optical fibers 3 brought in contact with the surfaces of the guide grooves 4 continuously formed on the uppermost fiber hole array $6_1$ is inclined in a direction indicated by an arrow in the figure until the multi fiber tape 1 is abutted against the upper side 60, it is preferable that an angle α formed by the axial lines of the respective optical fibers and the surfaces of the guide grooves 4 is set to, for example, 10° to 12°. This angle corresponds to an angle ensured in the case where the multi fiber tape A having the leading ends of the optical fibers C brought in contact with the guide grooves D continuously formed on the second upper fiber hole array F is inclined in the direction indicated by the arrow in the figure until the multi fiber tape A is abutted against the upper side N of the entry B in the conventional ferrule for a multi fiber optical connector shown in FIG. 10.

THIRD EMBODIMENT

Figure 5:
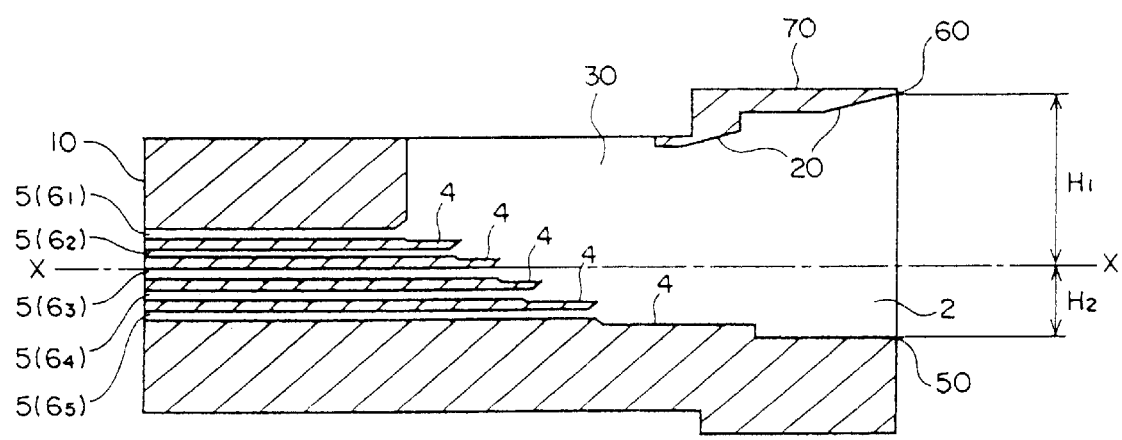
FIG. 5 is a vertical cross-sectional view showing a ferrule for a multi fiber optical connector in accordance with a third embodiment of the present invention.

A ferrule for a multi fiber optical connector in accordance with still another embodiment of the present invention will be described with reference to FIG. 5. The basic structure of the ferrule for a multi fiber optical connector is identical with that shown in the above-described second embodiment. A difference from the second embodiment resides in that an upper surface 20 of the entry 2 is tapered in such a manner that the upper surface 20 is inclined upward toward the outside from the inside in an inserting direction of the multi fiber tape as shown in FIG. 5. As a result, the distance $H_1$ of from the straight line X-X that connects the middle points between the center axes of the fiber holes 5 that make up the uppermost fiber hole array $6_1$ and the center axes of the fiber holes 5 that make up the lowermost fiber hole array $6_5$ to the upper side 60 of the entry 2 is longer than the distance $H_2$ of from the straight line X-X to the lower side 50 thereof. In addition, it is possible to ensure the distance $H_1$ longer than that in the ferrule for a multi fiber optical connector described in the second embodiment. Therefore, the leading ends of the optical fibers 3 are more surely pressed against the guide grooves 4 continuously disposed on the uppermost fiber hole array $6_1$. As a result, the optical fibers 3 can be more smoothly inserted into the leading fiber holes 5 continuous to the guide grooves 4.

FOURTH EMBODIMENT

Figure 6A:
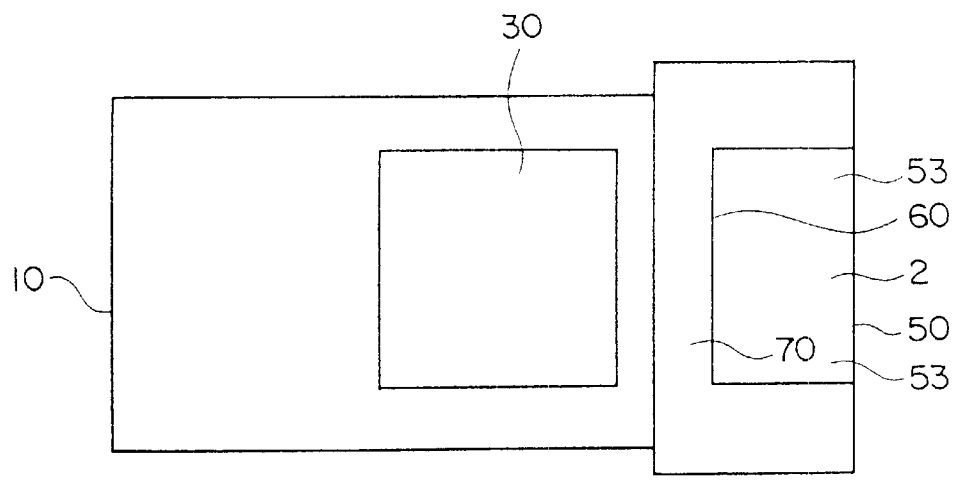
FIG. 6A is a plan view showing a ferrule for a multi fiber optical connector in accordance with a fourth embodiment of the present invention.
Figure 6B:
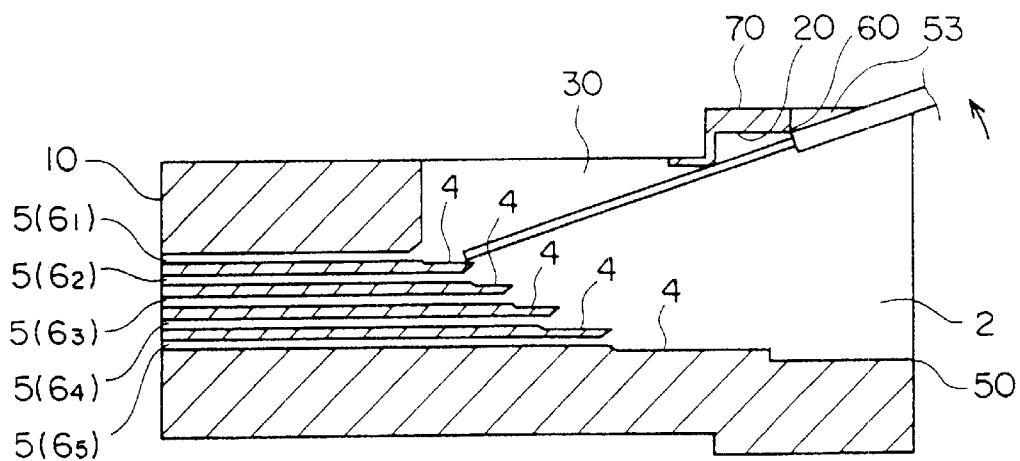
FIG. 6B is a vertical cross-sectional view of the ferrule.

A ferrule for a multi fiber optical connector in accordance with yet still another embodiment of the present invention will be described with reference to FIGS. 6A and 6B. The basic structure of the ferrule for a multi fiber optical connector is identical with that shown in the above-described second embodiment. A difference from the second embodiment resides in that a ceiling 70 of the entry 2 is notched into a rectangle toward an adhesive inlet 30 side from the entrance side of the entry 2 to form an opening 53 as shown in FIG. 6A. The formation of the opening 53 makes it possible to largely incline the multi fiber tape 1 in a direction indicated by an arrow in the figure as large as the opening 53 as compared with the ferrules for a multi fiber optical connector described in the first embodiment and the second embodiment. Therefore, the leading ends of the optical fibers 3 can be more surely pressed against the guide grooves 4. As a result, the optical fibers 3 can be more smoothly inserted into the leading fiber holes 5 continuous to the guide grooves 4.

FIFTH EMBODIMENT

Figure 7:
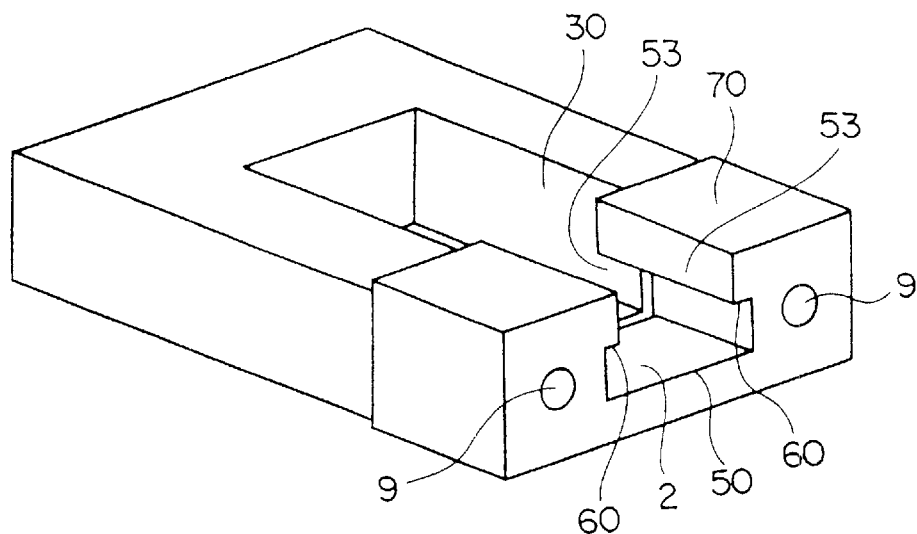
FIG. 7 is a perspective view showing a ferrule for a multi fiber optical connector in accordance with a fifth embodiment of the present invention.
Figure 8:
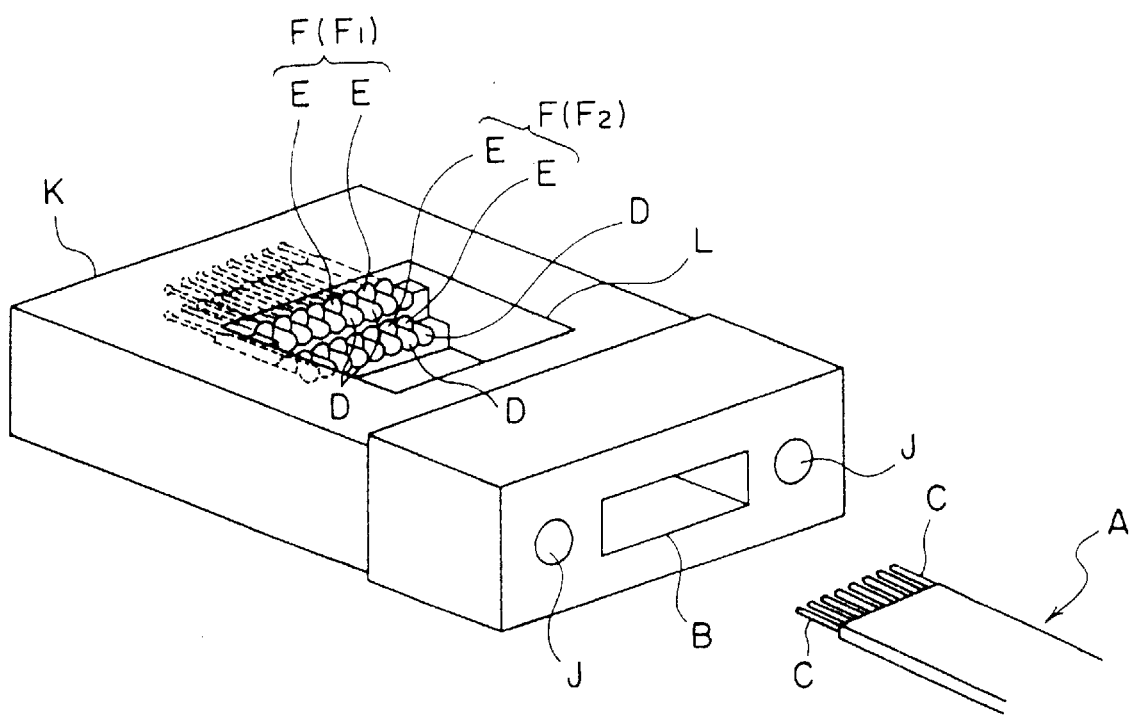
FIG. 8 is a perspective view showing an example of conventional ferrules for a multi fiber optical connector.

A ferrule for a multi fiber optical connector in accordance with yet still another embodiment of the present invention will be described with reference to FIG. 7. The basic structure of the ferrule for a multi fiber optical connector is identical with that shown in the above-described fourth embodiment. A difference from the fourth embodiment resides in that the ceiling 70 of the entry 2 is notched in such a manner the notched portion extends from the entrance side of the entry 2 to the adhesive inlet 30, to thereby form the opening 53 that makes the adhesive inlet 30 communicate with the entry 2. The formation of the opening 53 makes it possible to further largely incline the multi fiber tape 1 in a direction indicated by an arrow in FIG. 6B. Therefore, the leading ends of the optical fibers 3 can be more surely pressed against the guide grooves 4. For convenience of the figure, the guide grooves and the fiber holes are omitted in FIG. 7.

As was described above, in a ferrule for a multi fiber optical connector according to one aspect of the present invention, a distance $H_2$ of from a straight line that connect middle points between the center axes of the fiber holes that make up a fiber hole array at one end side in a laminating direction and the center axes of the fiber holes that make up a fiber hole array at another end side to an upper side of the entry is set to be longer than a distance $H_1$ of from the straight line to a lower side of the entry. Therefore, when the leading end of each of the optical fibers is pressed against the corresponding guide groove while the multi fiber tape inserted from the entry is inclined toward the upper side of the entry, the multi fiber tape can be satisfactorily inclined toward the upper side of the entry. As a result, the leading end of each of the optical fibers is surely pressed against the corresponding guide groove, and the guide grooves are sufficiently utilized, thereby making it possible to smoothly insert the respective optical fibers into the corresponding fiber holes. The above advantages are effective particularly in inserting the respective optical fibers into the corresponding fiber holes that make up the third or higher-order fiber hole arrays in the case where three or more fiber hole arrays are laminated.

In a ferrule for a multi fiber optical connector according to another aspect of the present invention, the upper surface of the entry is tapered in such a manner that the upper surface is inclined upward toward the outside from the inside in an inserting direction of the multi fiber tape. Therefore, the distance $H_2$ becomes longer, and the above advantages are more ensured.

In a ferrule for a multi fiber optical connector according to still another aspect of the present invention, the ceiling of the entry is notched to form an opening. With this structure, when the multi fiber tape inserted from the entry is inclined toward the upper side of the entry, the inclination of the multi fiber tape is not regulated by the ceiling of the entry. Therefore, the multi fiber tape is sufficiently inclined toward the upper side, thereby being capable of surely pressing the leading end of each of the optical fibers against the corresponding guide groove. As a result, the guide grooves are sufficiently utilized, thereby making it possible to smoothly insert the respective optical fibers into the corresponding fiber holes. The above advantages are effective particularly in inserting the respective optical fibers into the corresponding fiber holes that make up the third or higher-order fiber hole arrays in the case where three or more fiber hole arrays where the fiber holes are arranged in plural parallel lines are laminated vertically.

According to yet still another aspect of the present invention, there is provided a method of manufacturing a multi fiber optical connector in which when the multi fiber tape is inserted into the ferrule for the multi fiber optical connector from the entry of the ferrule, the multi fiber tape is obliquely inclined to provide an angle between each of the optical fibers and a plane extending in the arrangement direction of said guide groove arrays. With this operation, the leading end of each of the optical fibers is surely and sufficiently pressed into the corresponding guide groove. Consequently, the optical fibers can be smoothly inserted into the corresponding fiber holes while being guided by the guide grooves.

The foregoing description of the preferred embodiments of the invention has been presented for purposes of illustration and description. It is not intended to be exhaustive or to limit the invention to the precise form disclosed, and modifications and variations are possible in light of the above teachings or maybe acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A ferrule for a multi fiber optical connector comprising:
   an entry into which a multi fiber tape is insertable;
   guide groove arrays in which a plurality of guide grooves that guide the respective optical fibers that make up the multi fiber tape inserted from the entry are arranged in plural parallel lines; and
   fiber hole arrays in which a plurality of fiber holes into which the respective optical fibers guided by the respective guide grooves are inserted are arranged in plural parallel lines;
   wherein said guide groove arrays and said fiber hole arrays are laminated at plural stages in a single ferrule, and a distance of from a straight line that connect middle points between the center axes of the fiber holes that make up a fiber hole array at one end side in a laminating direction and the center axes of the fiber holes that make up a fiber hole array at another end side to an upper side of the entry is longer than a distance of from the straight line to a lower side of the entry.

2. The ferrule for a multi fiber optical connector as claimed in claim 1, wherein the upper surface of the entry is taped such that the upper surface is inclined upward toward the outside from the inside in a direction of inserting the multi fiber tape so that the distance of from the straight line that connect middle points between the center axes of the fiber holes that make up the fiber hole array at one end side in the laminating direction and the center axes of the fiber holes that make up the fiber hole array at another end side to the upper side of the entry is longer than the distance of from the straight line to the lower side of the entry.

3. A ferrule for a multi fiber optical connector comprising:
   an entry into which a multi fiber tape is insertable;
   guide groove arrays in which a plurality of guide grooves that guide the respective optical fibers that make up the multi fiber tape inserted from the entry are arranged in plural parallel lines; and fiber hole arrays in which a plurality of fiber holes into which the respective optical fibers guided by the respective guide grooves are inserted are arranged in plural parallel lines;

wherein a ceiling of the entry is notched to form an opening so that an inclination of the multi fiber tape is not regulated by the upper side of the entry when a leading end of each of the optical fibers is pressed against the corresponding guide groove while the multi fiber tape inserted from the entry is inclined toward the upper side of the entry.

4. The ferrule for a multi fiber optical connector as claimed in claim 3, wherein the ceiling of the entry is notched to form an opening so that an angle formed between the axial line of each of the optical fibers and the surface of each of the guide grooves becomes 10° to 30° when the multi fiber optical tape inserted from the entry is inclined until the multi fiber tape is abutted against the upper side of the entry and the leading end of each of the optical fibers is pressed against the corresponding guide groove.

5. The ferrule for a multi fiber optical connector as claimed in claim 3, wherein an adhesive inlet into which an adhesive for fixing each of the optical fibers inserted into the optical holes to the ferrule is injected is formed on the upper surface of the ferrule, and the ceiling of the entry is notched to form an opening that extends to the adhesive inlet.

6. A method of manufacturing a multi fiber optical connector comprising:

an entry into which a multi fiber tape is insertable;

guide groove arrays in which a plurality of guide grooves that guide the respective optical fibers that make up the multi fiber tape inserted from the entry are arranged in plural parallel lines; and fiber hole arrays in which a plurality of fiber holes into which the respective optical fibers guided by the respective guide grooves are inserted are arranged in plural parallel lines, in which a ferrule for the multi fiber optical connector having said guide groove arrays and said fiber hole arrays laminated at plural stages in a single ferrule and having a distance of from a straight line that connect middle points between the center axes of the fiber holes that make up a fiber hole array at one end side in a laminating direction and the center axes of the fiber holes that make up a fiber hole array at another end side to an upper side of the entry longer than a distance of from the straight line to a lower side of the entry is fitted to the multi fiber tape; said method comprising the steps of:

providing an angle between each of the optical fibers of multi fiber tape and a plane extending in the arrangement direction of said guide grooves by inclining said multi fiber tape obliquely and downward when inserting the multi fiber tape into the ferrule for the multi fiber optical connector from the entry of the ferrule.

7. The method of manufacturing a multi fiber optical connector as claimed in claim 6, wherein an angle is formed between each of the optical fibers inserted into a second or higher-order fiber hole array from the lowermost fiber hole array and a plane extending in the arrangement direction of the guide groove arrays for guiding the optical fibers to the fiber hole arrays.

8. The method of manufacturing a multi fiber optical connector as claimed in claim 6, wherein an angle of 10° to 30° is formed between each of the optical fibers inserted into the uppermost fiber hole array and a plane extending in the arrangement direction of the guide groove arrays for guiding the optical fibers to the fiber hole arrays.

* * * * *